(No Model.) 3 Sheets—Sheet 1.

F. A. & E. N. GATES.
WATER HEATING SYSTEM.

No. 484,193. Patented Oct. 11, 1892.

WITNESSES:

INVENTORS
F. A. Gates
E. N. Gates (No Model.) 3 Sheets—Sheet 2.

F. A. & E. N. GATES.
WATER HEATING SYSTEM.

No. 484,193. Patented Oct. 11, 1892.

WITNESSES:
Ewing W. Hamlen
A. S. Harrison

INVENTORS
F. A. Gates
E. N. Gates
by Wright Brown Quinby Atty

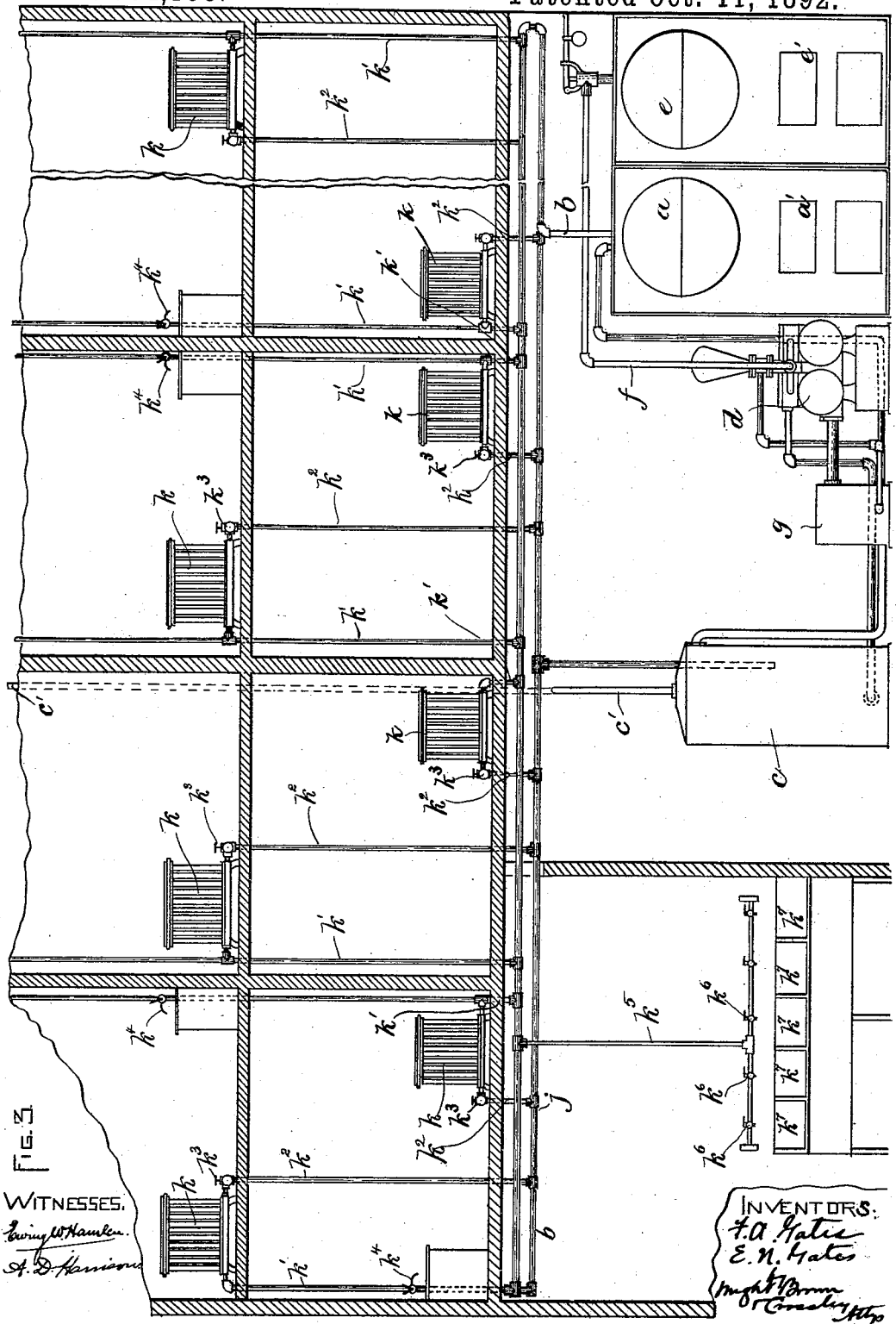

UNITED STATES PATENT OFFICE.

FANNIE A. GATES AND EUGENE N. GATES, OF FITCHBURG, MASSACHUSETTS, ASSIGNORS TO THE E. N. GATES HEATING COMPANY, OF SAME PLACE.

WATER-HEATING SYSTEM.

SPECIFICATION forming part of Letters Patent No. 484,193, dated October 11, 1892.

Application filed August 31, 1891. Serial No. 404,263. (No model.)

*To all whom it may concern:*

Be it known that we, FANNIE A. GATES and EUGENE N. GATES, of Fitchburg, in the county of Worcester and State of Massachusetts, have invented certain new and useful Improvements in Water-Heating Systems, of which the following is a specification.

This invention has for its object to provide a system for the utilization of hot water for heating or other purposes, and particularly for heating, in which the temperature at the radiators or points where the hot water is utilized may be regulated or varied without changing the actual temperature of the water at the point where it is heated.

The invention also has for its object to provide a heating system which shall be effective, economical, and durable.

To these ends the invention consists in the improvements which we will now proceed to describe and claim.

Figure 1:
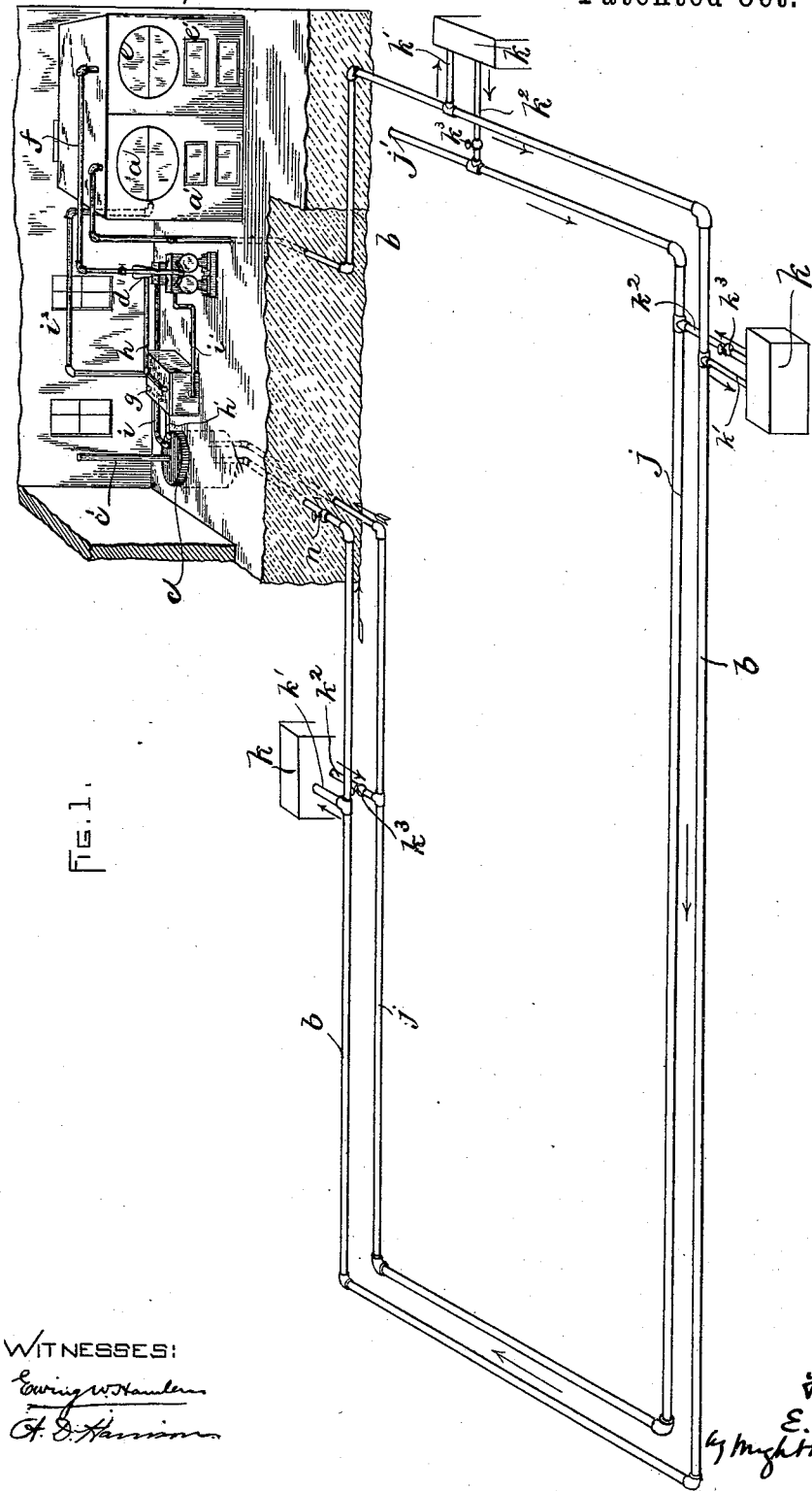
Figure 2:
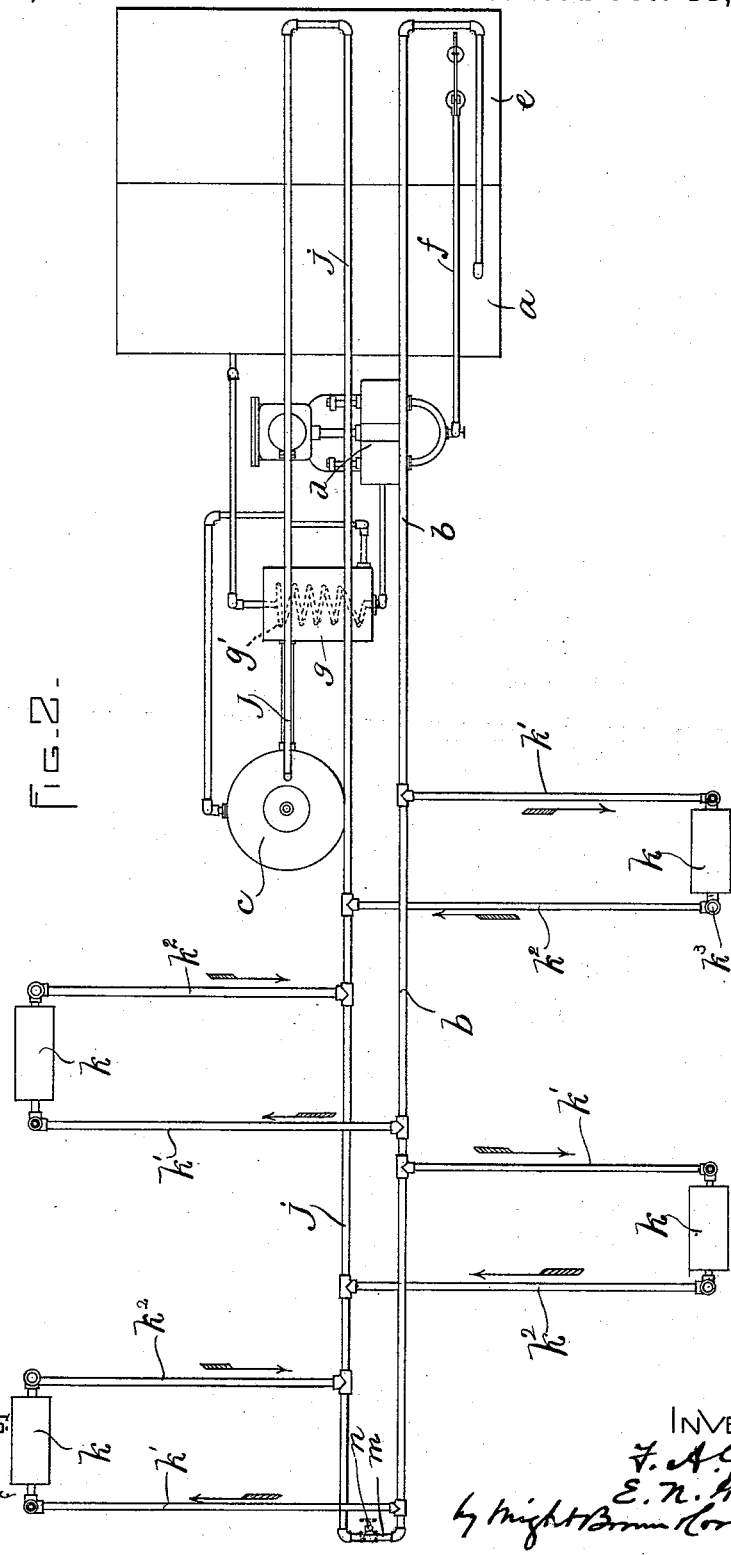

Of the accompanying drawings, forming a part of this specification, Figure 1 represents a perspective view of a water-heating system embodying our invention. Fig. 2 represents a top plan view of a modification of said system. Fig. 3 represents a sectional elevation of a building provided with a heating system embodying our invention.

The same letters of reference indicate the same parts in all the figures.

In carrying out our invention we provide a heater or receptacle $a$, in which water may be heated, said heater being here shown as a water-receptacle of the kind commonly known as a "boiler," located over a furnace or fire-box $a'$, which is arranged to heat the water in the boiler $a$.

$b$ represents a supply-pipe, which extends from the boiler $a$ and is adapted to conduct hot water therefrom through the locality or district in which the water is to be utilized, said pipe being connected at suitable intervals with radiators or other means for utilizing the water. The supply-pipe $b$ discharges the water supplied to it through the radiators and, if desired, at its end opposite the receiving end, each radiator being connected, as hereinafter described, at its receiving end with the supply-pipe and having at its delivering end an outlet adapted to discharge water outside of the supply-pipe. All the outlets of the supply-pipe, whether through the radiators or connected directly with the pipe, are arranged so that there is practically no pressure opposing the departure of the water from said outlets. By this we mean that there is no such opposition to or pressure upon the discharged water in its departure from said outlets as would exist if the outlets discharged directly into the boiler in which the water is heated, so that nearly the same pressure would be exerted on the water at the delivering end as at the receiving end of the supply-pipe. The said outlets may be arranged to deliver the water into a sewer; but for the sake of economy we prefer to discharge the water from the supply-pipe and radiators into a tank $c$, from which it may be drawn, as hereinafter described, and forced again into the boiler, this arrangement being adopted for the sake of economy both of water and fuel, the heat remaining in the water after it has passed through the pipe $b$ being utilized.

The tank $c$ is open to the atmosphere, so that the discharge of the water from the pipe into said tank will not be attended by the pressure or resistance that would be experienced if the pipe should be discharged directly into the boiler $a$. The communication between the tank $c$ and the atmosphere may be effected by a pipe $c'$, extending above the highest part of the system, or in any other suitable way, whereby the entrance of the return-water into it will be practically free or without resistance, as compared with the discharge of water into a boiler where the pressure resisting the entrance of water will be such as to preclude any considerable change in the rate or velocity of movement of the water.

$d$ represents a pump which is arranged to maintain a pressure of water in the supply-pipe and radiators. Said pump is preferably arranged as shown in Fig. 1, to draw water from the tank $c$ and force it from said tank into the boiler $a$, the boiler being kept filled with water, so that the force of the pump maintains a constant circulation of water through the supply-pipe $b$ so long as said pipe has an outlet. The capacity of the pump must exceed that of the outlet or outlets from the supply-pipe and radiators, so that a constant pressure can be maintained by the pump against all radiating-surfaces.

We prefer to employ a steam-pump and to generate the steam used to operate the pump in a steam boiler or generator $e$, which may be located beside the boiler $a$ and heated by a furnace $e'$, as shown in Fig. 1, said boiler being connected with the pump by a steam-pipe $f$.

We prefer to utilize the steam that operates the pump after it has done its work in heating the water passing from the tank $c$ to the boiler $a$, and to this end we employ a casing or tank $g$, which is connected with the tank $c$ and with the pump, so that the water passes through said tank to the pump, and a coil or conduit $g'$, connected with the pump so as to receive the exhaust-steam therefrom and arranged in the tank $g$, so that the water passing through said tank will be subjected to the heat of the exhaust-steam, the latter being condensed in said coil $g$. The water of condensation may be trapped and returned to the boiler or may be otherwise disposed of. If desired, the exhaust-steam coil or conduit $g'$ may be placed directly in the tank $c$, in which case the tank $g$ will be omitted. By this arrangement all the water passing from the tank to the boiler is subjected to the heat of the exhaust-steam and is partially heated before entering the boiler, so that the waste steam from the pump is fully utilized.

$j$ represents the return-pipe, which accompanies the supply-pipe $b$ and discharges into the tank $c$. Said return-pipe has a dead end at $j'$, which is closed.

The radiators $k$, or other heat-utilizing means, are each connected with the supply-pipe by an inlet branch or connection $k'$, and with the return-pipe by an outlet connection $k^2$, so that the water enters each radiator through a pipe $k'$ and is discharged therefrom into the return-pipe $j$ through the pipe $k^2$, the water discharged from each radiator passing to the tank $c$. Each discharge-pipe $k^2$ is provided with a valve $k^3$, the adjustment of which determines the volume of the flow of the water through the accompanying radiator.

In Fig. 1 we show the return-pipe $j$ as made separate from the supply-pipe $b$ and connected with it only through the radiators. In Fig. 2 we show the return-pipe $j$ as a continuation of the supply-pipe $b$, and connected with the discharging end of the latter, so that the water which reaches the extreme outer end of the supply-pipe without having passed indirectly to the return-pipe through the radiators may pass directly to the return-pipe through a connecting-pipe $m$, the radiators being connected in this construction, as in the one shown in Fig. 1, by inlet connections $k'$ with the supply-pipe and by outlet connections $k^2$ with the return-pipe, each of said outlet connections having a valve $k^3$.

We prefer to provide the supply-pipe with a valve $n$, located between the last point of connection of said pipe with a radiator or other heat-utilizing device and the discharge end of the pipe. Said valve, by regulating the velocity of the escape or discharge of the water from the supply-pipe, regulates the temperature to a certain extent throughout the whole length of the pipe $b$ and throughout the radiators connected therewith. In the arrangement shown in Fig. 1 the valve $n$ is located directly in said pipe and between the last radiator of the series and the tank $c$.

We have found that by maintaining an artificially-forced circulation in the pipes and radiators of a hot-water heating system by the action of a pump, as described, and at the same time providing means for regulating the volume or velocity of flow of the water discharged from the supply-pipe $b$, or from the radiators connected therewith, we can effect a considerable variation in the temperature of the radiating-surfaces without varying the heat of the water supplied. Hence by providing the valves $n$ at the discharge end of the supply-pipe and the valves $k^3$ in the discharge connections of the radiators we are enabled to control the temperature and maintain it at any desired point within certain limits. To make either of said valves effective it should be adjusted so that there is always more pressure on the entrance to the radiator or supply-pipe than the valve is allowing to escape. This will keep the system full and at a mean temperature. When it is desired to increase the temperature, the valve is opened, whereupon the volume of water passing will be increased and with a corresponding increase in the rapidity of the radiation of heat. The rapidity of radiation may be decreased by partially closing the valve. We consider it important, however, that the valve be always adjusted so that the pipe or radiator controlled thereby cannot discharge water in excess of the capacity of the supply-pipe to furnish, and, further, that the capacity of the pump be in excess of the maximum aggregate capacity of the outlets for the return-water, so that the supply of water in the supply-pipe and in any radiator cannot fall below the quantity required to fill the same and maintain a pressure against the radiating-surfaces.

It has been proved by experiment in a system in which the circulation is natural and not artificial that although at the entrance to a radiator the water may be at a high temperature the temperature of the radiating-surfaces always corresponds to the volume of water passing through the radiator up to the point when the radiating-surface will practically be of the same temperature as the supply-water. We are aware that a valve in a hot-water heating apparatus has been placed in some cases on the supply and in other cases on the return end of the radiator, but in either case the valve will not govern the temperature of the radiating-surfaces in a system without artificial circulation, because if the valve be open equal to an area of one-eighth of an inch the temperature of the water in the boiler will solely control the circulation and temperature at the radiators, while in my improved system, having artificial circulation, the valve will control the temperature of the radiator even when the water at the point where it enters the radiator is of a temperature above the boiling-point.

In our improved sytem of heating we do not desire to usually heat the water above 212° where it enters the radiating-surfaces, and not above 225° in the boiler and in the main lines, because the velocity with which the water travels will convey as much heat to a given point by its velocity as it could if it were superheated water of 500° circulating more slowly or converted into steam.

The improvement gained by having the discharge end of the piping of the system emptying into a receiver without any pressure at this point against its free departure that will cause anything like the same resistance or force that is given to the water in the supply-pipe, causes the water to travel with great speed, so that the volume of water discharged, which represents so much heat, will be in proportion to the difference in the pressure on the supply and return lines rather than on the size of the pipe conveying the water where same pressure is on each end of the supply.

Only one pump, and that to force water into the heating-boiler, is necessary to give all the force required for supply to the boiler and distribution from the same.

An important advantage, and a great saving of expenses, result from the fact that small pipes can be used, said pipes conveying a volume of water with great velocity, heated to a comparatively-low temperature and producing an effect equivalent to that of a small quantity of water delivered at a much-higher temperature at a slower speed to the same point. It is also a fact that high temperatures cause the disintegration of the material of which the boilers and pipes are constructed. Our system is free from this objection because there is no necessity of heating the water to an injurious temperature.

We are aware that attempts have been made to convey highly-heated water to points distant from the boiler by forming a loop, which is really a portion of the boiler, and causing a pump to keep this water in circulation; but in all such attempts the pump has forced the water directly back into the boiler, so that the pressure has been alike on both ends of the pipe. Hence there can be no regulation of temperature or radiation by varying the volume passing through the pipes and radiators.

The construction shown in Figs. 1 and 2 relate to a system in which the water is heated at a central station located in one building and is circulated through a territory or district, it may be, outside of said building, this being the arrangement preferred when large areas including several distinct buildings are to be supplied with heat.

In Fig. 3 we show the adaptation of our invention to the heating of a single building, the same principle being involved as in the construction first described, the differences being sufficiently indicated by the drawings without the necessity of additional description further than to state that the outlet connection $k^2$ between the radiators and the return-pipe may be provided with faucets $k^4$, so that hot water may be drawn from said pipes for domestic purposes. We have also shown in Fig. 3 a branch pipe $k^5$ leading from the return-pipe and communicating with a series of faucets $k^6$, which may supply the tubs $k^7$ of a laundry.

We claim—

1. The combination of a heater, a supply-pipe leading from said heater, radiators having outlet-pipes, connections between said radiators and supply-pipe, the said supply-pipe and the said outlet-pipes leading to a tank open to atmospheric pressure, and a pump for forcing water through the system, the size of the outlet from the supply-pipe being such relatively to the capacity of the pump that the pump will maintain a pressure in the supply-pipe, substantially as and for the purpose set forth.

2. The combination of a heater, a supply-pipe leading from said heater, radiators having outlet-pipes, connections between said radiators and supply-pipe, the said supply-pipe and the said outlet-pipes leading to a tank open to atmospheric pressure, and a pump for forcing water through the system, and means for altering the size of the outlet from the supply pipe, substantially as described.

In testimony whereof we have signed our names to this specification, in the presence of two subscribing witnesses, this 24th day of August, A. D. 1891.

FANNIE A. GATES.
    EUGENE N. GATES.

Witnesses:
 STILLMAN HAYNES,
 EMILY M. KENDALL.